United States Patent
Akers et al.

(10) Patent No.: US 6,814,793 B2
(45) Date of Patent: Nov. 9, 2004

(54) BLEED CONTROL USING CATIONIC DYES AS DISPERSANT IN PIGMENT DISPERSIONS

(75) Inventors: Charles Edward Akers, Lexington, KY (US); Mohanram Jayaram, Lexington, KY (US); Jing X. Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 33 days.

(21) Appl. No.: 10/325,220

(22) Filed: Dec. 18, 2002

(65) Prior Publication Data

US 2004/0118320 A1 Jun. 24, 2004

(51) Int. Cl.[7] .......................... C09D 11/02; G01D 11/00
(52) U.S. Cl. .................. 106/31.6; 106/31.28; 106/499; 347/100
(58) Field of Search ............... 106/31.6, 31.28, 106/499; 347/100

(56) References Cited

U.S. PATENT DOCUMENTS

| | | |
|---|---|---|
| 4,321,870 A | 3/1982 | Zasloff |
| 5,106,416 A | 4/1992 | Moffatt et al. |
| 5,116,409 A | 5/1992 | Moffat |
| 5,181,045 A | 1/1993 | Shields et al. |
| 5,198,023 A | 3/1993 | Stoffel |
| 5,300,143 A | 4/1994 | Schwarz, Jr. |
| 5,320,668 A | 6/1994 | Shields et al. |
| 5,342,439 A | 8/1994 | Lauw |
| 5,389,131 A | 2/1995 | Colt et al. |
| 5,428,383 A | 6/1995 | Shields et al. |
| 5,462,592 A | 10/1995 | Murakami et al. |
| 5,485,188 A | 1/1996 | Tochihara et al. |
| 5,488,402 A | 1/1996 | Shields et al. |
| 5,536,306 A | 7/1996 | Johnson et al. |
| 5,555,008 A | 9/1996 | Stoffel et al. |
| 5,679,143 A | 10/1997 | Looman |
| 5,730,790 A | 3/1998 | Rehman |
| 5,785,743 A | 7/1998 | Adamic et al. |
| 5,801,738 A | 9/1998 | Stoffel et al. |
| 5,911,815 A | 6/1999 | Yamamoto et al. |
| 5,958,121 A | 9/1999 | Lin |
| 5,969,112 A * | 10/1999 | Feeman et al. .............. 534/604 |
| 5,985,015 A | 11/1999 | Kanaya |
| 6,022,908 A | 2/2000 | Ma et al. |
| 6,036,759 A | 3/2000 | Wickramanayake et al. |
| 6,130,319 A | 10/2000 | Feeman et al. |
| 6,176,913 B1 | 1/2001 | Kasperchik et al. |
| 6,221,143 B1 | 4/2001 | Palumbo |
| 6,247,808 B1 | 6/2001 | Ma et al. |
| 6,248,161 B1 | 6/2001 | Nguyen et al. |
| 6,503,317 B1 * | 1/2003 | Ortalano et al. ............. 106/493 |

FOREIGN PATENT DOCUMENTS

| | | |
|---|---|---|
| EP | 0 952 195 A2 | 10/1999 |
| EP | 0 952 196 A1 | 10/1999 |

* cited by examiner

*Primary Examiner*—C. Melissa Koslow
*Assistant Examiner*—Veronica F. Faison
(74) *Attorney, Agent, or Firm*—John A. Brady

(57) ABSTRACT

An ink system comprising a first aqueous ink comprising a cationic pigment dispersion comprising a cationic dye and a pigment, and a second aqueous ink comprising an anionic dispersion comprising an anionic dispersant. The ink system reduces bleed between the two inks when they are applied side by side. The anionic dispersion in the second aqueous ink flocculates the cationic pigment dispersion in the first aqueous ink.

22 Claims, No Drawings

BLEED CONTROL USING CATIONIC DYES AS DISPERSANT IN PIGMENT DISPERSIONS

TECHNICAL FIELD

The present invention relates generally to ink employed in ink-jet printing. More particularly, it is directed to inks and to a system of inks in which color bleed is reduced or eliminated.

BACKGROUND OF THE INVENTION

Ink jet printing is accomplished by ejecting ink from a nozzle toward paper or another print medium. The ink is driven from the nozzle toward the medium in a variety of ways. For example, in electrostatic printing, the ink is driven by an electrostatic field. Another ink jet printing procedure, known as squeeze tube, employs a piezoelectric element in the ink nozzle. Electrically-caused distortions of the piezoelectric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

Preferably, an ink jet printer is capable of printing with colored ink, such as magenta, cyan and yellow, as well as black ink. When two colors are printed side by side, particularly when black ink is printed next to any other colored ink, the colors can "bleed" into one another. "Bleed" is defined as the migration of one ink color into a region of another ink color, particularly when black ink moves into a region of any other color. It is desirable to have a clean, crisp border between areas of two different colors. When one color bleeds into the other color, the border becomes irregular and ragged.

Bleed is particularly undesirable when black ink is printed next to a light color ink, such as yellow.

Numerous methods have been developed in an attempt to reduce or eliminate the bleed between different colors of ink, particularly the bleed between black ink and colored ink. Common methods used to control the bleed between different colors of ink include surface tension control, chelation control, and neutralization control.

The present invention is directed to black inks and to a system of black and colored inks in which color bleed is substantially reduced or eliminated.

SUMMARY OF THE INVENTION

The cationic pigmented ink of the present invention contains at least one cationic dye as a dispersant in a pigment dispersion contained in the ink. The interaction between a stable cationic ink dispersion and a stable anionic ink dispersion is used to reduce black-to-color bleed.

Using a cationic dye as a dispersant provides several advantages over using conventional polymeric dispersants to disperse a pigment. Due to their aromatic structure, cationic dyes have a strong interaction with pigments. Also, cationic dyes are soluble in acid solutions. As a result, cationic dyes are capable of stabilizing pigments in acidic solutions. In contrast, in acid solutions the charge of conventional anionic polymeric dispersants is neutralized and the solubility of the anionic polymeric dispersant decreases. Specific cationic dyes can also change the shade and/or optical density of a pigment.

An additional advantage to using cationic dyes as a dispersant includes the resulting light fastness of the ink. Using only a cationic dye in ink jet ink formulation produces inks with poor lightfastness. When a cationic dye is used as a dispersant, the combination of a cationic dye and a pigment produces an ink jet ink with improved lightfastness.

In the present invention, the flocculation characteristics or, in other words, the charge neutralization interaction, between the cationic dispersion based pigmented ink and anionic dispersion based ink is utilized. When the cationic dispersion based pigmented ink comes into contact with the anionic dispersion based ink, flocculation occurs at the interface, thus reducing or eliminating diffusion or bleed between different colors of ink.

In a first aspect, the present invention provides a cationic pigmented dispersion comprising a cationic dye as a dispersant and a pigment. Any dye known for use in ink jet printing may be employed as a cationic dye in the practice of the present invention so long as 1) the dye has a net positive charge, 2) the dye is capable of dispersing a pigment and comprises a hydrophobic region and a hydrophilic region, and 3) the dye exhibits sufficient solubility in water to be used in ink jet ink applications. Examples of cationic cyan dyes include, but are not limited to, any of the oxazine dyes, such as Basic Blue 3, Nigrosine, and Astra Blue. Examples of cationic magenta dyes include any of the polymethine dyes, such as Basic Violet 7 and Basic Red 14 and 15. Examples of catonic yellow dyes include, but are not limited to, the yellow dyes described in U.S. Pat. No. 5,969,112. In an embodiment, the cationic pigmented dispersion comprises a cationic dye and a black pigment, wherein the cationic dye is milled with the black pigment.

In another aspect, the present invention provides an ink composition comprising a cationic pigmented dispersion and an aqueous vehicle, wherein the cationic pigmented dispersion comprises a pigment and a cationic dye.

In another aspect, the present invention provides an ink set comprising a first aqueous ink comprising a cationic pigmented dispersion comprising a cationic dye and a pigment; and a second aqueous ink comprising an anionic dispersion.

In another aspect, the present invention provides a method for producing a cationic pigmented dispersion comprising milling a mixture comprising a pigment and a cationic dye.

In another aspect, the present invention provides a method for reducing intercolor bleed on a printed substrate comprising the steps of: applying a first aqueous ink to a first area of a substrate, said first aqueous ink comprising a pigmented dispersion comprising a cationic dye and a pigment; and applying a second aqueous ink to a second area of said substrate, said second aqueous ink comprising a pigment and an anionic dispersant, wherein said first area and said second area are in communication with each other. The steps of applying a first aqueous ink and applying a second aqueous ink may occur in any order or simultaneously.

DETAILED DESCRIPTION

Ink system as used herein is defined to mean an ink set which comprises at least two (preferably differently colored) inks. At least one ink comprises a cationic dye and a pigment and at least one ink comprises an anionic dispersion. The ink system exists when the ink comprising the cationic dye and pigment and the ink comprising an anionic dispersion are sold together as original components in an ink jet printer. The system also exists when the inks are sold separately as replacement cartridges or refills for cartridges with instructions for the inks to be used in conjunction with one another.

The ink system of the present invention often comprises two inks wherein a first aqueous ink comprises a cationic pigmented dispersion comprising a cationic dye and a pigment, and wherein a second aqueous ink comprises an anionic dispersion. The cationic dispersion acts as a flocculating agent with respect to the anionic dispersion, causing the anionic dispersion to agglomerate when the inks come into contact with each other. Such agglomeration/flocculation, can reduce or prevent bleed (color contamination) between colors after printing on a substrate.

Cationic dye as used herein is defined as a dye molecule that 1) has a net positive charge, 2) is capable of dispersing a pigment and comprises a hydrophobic region and a hydrophilic region, and 3) exhibits sufficient solubility in water to be used in ink jet ink applications.

A cationic dye may have one or more positively charged atoms. Positively charged atoms may include nitrogen atoms such as quaternary nitrogen atoms and protonated nitrogen atoms. Positively charged atoms may also include sulfur atoms.

The cationic dyes which may be employed in this invention are generally not limited. Commercial dyes, which meet the three criteria of a cationic dye, as previously defined, may be used in the present invention, whether they are identified as basic or cationic. Further, it is noted that the cationic charge can be pendant, i.e., insulated from the chromogenic part of the dye, or delocalized, wherein a cationic charge is delocalized in the chromogen. Commercially available dyes which may be employed in this invention include basic dyes listed in the Color Index. Additional dyes include cationic dyes derived from anthraquinone, diphenylmethane, triphenylmethane, acridine, pyran, thiopyran, indamine, azine, oxazine, thiazine, hemicyanine, azacarbocyanine, diazacarbocyanine, triazacarbocyanine and diazahemicyanine as well as dyes which may be classified as cationic azo type dyes.

Examples of dyes potentially useful as cationic dispersing dyes include, C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39, 40 and 108; C.I. Basic Blue 1, 3, 5, 7, 9, 22, 26, 41, 45, 46, 47, 54, 57, 60, 62, 65, 66, 69 and 71; C.I. Basic Black 8; Astra Blue, and Nigrosine.

Preferred commercial dyes which may be employed as a cationic dye include, but are not limited to, cationic cyan dyes such as any of the oxazine dyes, such as Basic Blue 3, Nigrosine, and Astra Blue. Other preferred commercial dyes which may be employed as a cationic dye include, but are not limited to, cationic magenta dyes such as any of the polymethine dyes, such as Basic Violet 7 and Basic Red 14 and 15. Examples of catonic yellow dyes include, but are not limited to, the yellow dyes described in U.S. Pat. No. 5,969,112. Other preferred commercial dyes which may be employed as a cationic dye include, but are not limited to, cationic yellow dyes such as any of the Basic Yellow inks, such as Basic Yellow 13 from the cyanine class and Basic Yellow 11 from the methine class of Basic Yellows.

In general, all of the conventional process steps used to make ink jet inks may be employed when making the first aqueous inks, including heating and stirring.

The first aqueous ink, therefore, is a solution comprising a cationic pigmented dispersion and an aqueous vehicle. The first aqueous ink often comprises about 0.6 to about 12.0 weight percent pigment based on total weight of the first aqueous ink. Preferably, the first aqueous ink comprises from about 2.0 to about 4.0 weight percent pigment based on total weight of the first aqueous ink. The first aqueous ink may also comprise about 5.0 to about 25% by weight percent humectant, about 0.05 to about 10% by weight penetrant, and about 0.1 to about 0.5 weight percent biocide based on total weight of the first aqueous ink, with any balance being deionized water.

The ratio of pigment to cationic dye in the cationic pigmented dispersion of the first aqueous ink is generally limited only to the extent that the first aqueous ink may be formed. The pigment to cationic dye ratio (P:D) often, however, ranges from about 14:1 to about 1:1, depending upon the cationic dye and pigments which are employed. A preferred ratio of pigment to cationic dye is about 4:1.

There is essentially no limitation to the pigments which may be employed in the first aqueous ink. Typical examples of pigments which may be used in the present invention include dye lakes, azo pigments including condensed azo pigments, and chelate azo pigments; polycyclic pigments, such as phthalocyanine pigments, anthraquinone pigments, quinacridone pigments, dioxazine pigments, thioindigo pigments, isoindolinone pigments, and quinophthalone pigments. Other pigments include nitro pigments, nitroso pigments and daylight fluorescent pigments as well as titanium dioxide, iron oxide, aniline black and carbon black. Preferred pigments for use in the first aqueous ink are carbon blacks.

It is also noted herein that aqueous inks comprise water. It is further noted that aqueous inks may further comprise a second solvent such as an organic solvent which is miscible with water. Selection of a suitable water miscible solvent depends on the requirements of the specific aqueous ink being formulated, such as the desired surface tension and viscosity, the pigment being used, the drying time required for the pigmented ink, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-buty alcohol, t-butyl alcohol, iso-butyl alcohol, furfuryl alcohol, and tetrahydrofurfuryl alcohol; (2) ketones or keto alcohols, such as acetone, methyl ethyl ketone, and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether, (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful solvents include lactones and lactams.

When miscible mixtures of water and an organic solvent are used as the solvent for the first aqueous ink, the mixtures usually comprise greater than about 25% by weight water to about 99.9% by weight water based on total weight of the mixture. The preferred weight percent of water employed is about 50% to about 99.9% based on total weight of the mixture. Often the first aqueous ink has a pH below 7. It is more preferable that the pH be between about 4 and about 6. The pH can be obtained by adding either a base or an acid to the prepared first aqueous ink as necessary to adjust the pH. Appropriate acids and bases are well known in the art. Should it be necessary to add a base, the base preferably is potassium hydroxide. Should it be necessary to add an acid, the acid preferably is glycolic acid and acetic acid.

The first aqueous ink composition of the present invention may be prepared by any method known in the art for making such compositions. The key aspect of the composition is that the pigment and cationic dye form a stable dispersion in the first ink solvent. In one method, the pigment and the cationic dye are first mixed together, then milled in an attritor to reduce the particle size to an acceptable level. This material is then blended with the other ink components. Optionally, a surfactant may be added to enhance the pigment dispersion and modify the surface tension of the ink to control its penetration into the paper. Suitable surfactants include nonionic, amphoteric and ionic surfactants. Other additives such as biocides, humectants, chelating agents, and viscosity modifiers, may be added at their art established levels to achieve their art known benefits.

There is generally no limitation with respect to how the second aqueous ink employed in the instant invention is made so long as an anionic dispersion is included in the second ink. Any typical ink additives like, for instance, humectants may be added to the solvent or aqueous solution wherein conventional steps like heating and mixing may be employed to enhance the functional properties of the ink. In preferred embodiments, the anionic dispersion comprises an anionic polymeric dispersant and a pigment. In especially preferred embodiments, the anionic dispersion comprises an anionic polymeric dispersant and a colored pigment.

The anionic dispersants useful in this invention are generally not limited and include any of those capable of dispersing, for example, pigments, especially colored pigments. The dispersants typically comprise hydrophobic and hydrophilic polymeric segments. The hydrophobic segment tends to interact with the pigment particle in the second aqueous ink and the hydrophilic segment tends to be solvated by the aqueous medium thereby dispersing the pigment.

Illustrative examples of the dispersants which may be employed in the second aqueous ink of invention include AB, BAB and ABC block copolymers known in the art. Preferred AB and BAB block copolymers include those, for example, which comprise hydrophobic and hydrophilic segments derived from acrylic monomers. Such dispersants are further described in U.S. Pat. No. 5,085,698. Another illustrative example of dispersants includes random polymers.

A preferred class of dispersants which may be employed in the present invention include block and/or graft co- or terpolymers comprising a hydrophilic polymeric segment, and one or two hydrophobic polymeric segment(s) having a hydrolytically stable siloxyl substituent or a hydrophobic amide side chain. A particularly preferred subgroup of these dispersants are graft terpolymers which comprise a hydrophilic polymeric segment (particularly an acrylic or methacrylic acid co- or terpolymer) together with a hydrophobic polymeric segment derived from a polyorganosiloxane as described in U.S. Pat. No. 5,719,204.

Another group of polymeric dispersants are graft polymers which comprise a hydrophilic polyacrylic acid backbone of weight average molecular weight between about 1,000 and about 5,000, and hydrophobic segment side chains randomly grafted to the backbone. Often at least about 0.5% and no more than about 50% of all reactive sites on the polymer backbone have grafted thereon one of the structural units described above.

There is essentially no limitation to the pigments which may be employed in the second aqueous ink. Typical examples of pigments which may be used in the second aqueous ink include dye lakes, azo pigments including condensed azo pigments, and chelate azo pigments; polycyclic pigments, such as phthalocyanine pigments, anthraquinone pigments, quinacridone pigments, dioxazine pigments, thioindigo pigments, isoindolinone pigments, and quinophthalone pigments. Other pigments include nitro pigments, nitroso pigments and daylight fluorescent pigments as well as titanium dioxide, iron oxide, aniline black and carbon black. Preferred pigments for use in the second aqueous ink are colored pigments.

Additives which may be employed in the second aqueous ink of this invention include humectants, penetrants, biocides, and binders.

The humectants which may be employed in this invention are generally not limited and are known in the art. Illustrative examples include alkylene glycols like diethylene glycol, triethylene glycol, tetraethylene glycol and polyethylene glycols as well as diols such as 1,2-propanediol and 1,2-butanediol.

The penetrants, which may be employed in this invention are generally not limited and includes hydroxy substituted hydrocarbons like 1,2-alkyl diols such as 1,2-pentanediol, 1,2-hexanediol and mixtures thereof. A more detailed description of such penetrants may be found in U.S. Pat. No. 5,364,461.

The biocides which may be employed are known and commercially available. They prevent growth of microorganisms in the ink. Examples of biocides that are suitable for use in this invention include those, for instance, which comprise benz-isothiazolin-one, methyl-isothiazolin-one and chloro-methyl-isothiazolin-one.

The binders which may be employed in this invention are generally not limited and include binders that are known and commercially available. Examples of binders include latex polymers comprising acrylic acid, methacrylic acid, alkyl acrylate esters, styrene, alkyl methacrylate esters, and mixtures thereof.

The second aqueous ink often comprises about 0.6 to about 12.0 weight percent pigment based on total weight of the second aqueous ink. Preferably, the second aqueous ink comprises from about 2.0 to about 4.0 weight percent pigment based on total weight of the second aqueous ink. The second aqueous ink may also comprise about 5.0 to about 25% by weight percent humectant, about 0.05 to about 10% by weight penetrant, and about 0.1 to about 0.5 weight percent biocide based on total weight of the second aqueous ink, with any balance being deionized water.

The first and second aqueous inks of this invention are made available as an ink system. This system can comprise the first and second inks sold together as a kit. This kit exists when the two inks are sold together as original components in a new printer. The kit comprising the two inks can also be sold as replacement cartridges. The system also comprises the first ink that is sold individually as a replacement cartridge with instructions that it be used in conjunction with the second ink. Similarly, the system comprises the second ink sold individually as a replacement cartridge with instructions that it be used with the first ink.

The two inks of the ink system can be applied to the substrate so that the first ink and the second ink contact one another along at least one border. They can be applied to the substrate in any order, essentially simultaneously, or one ink can be applied after the other ink has substantially dried on the substrate.

In an embodiment of the ink set of the present invention, a first aqueous ink comprises a pigmented dispersion comprising a cationic dispersing dye and a black pigment; and a second aqueous ink comprising one of the following: a yellow ink comprising an anionic pigment dispersion; a cyan ink comprising an anionic pigment dispersion; or a magenta ink comprising an anionic pigment dispersion.

In another aspect, the present invention provides a method for producing a pigmented dispersion comprising milling a mixture comprising a pigment and a cationic dye.

In one method, the pigment and the cationic dye are first mixed together, then milled in an attritor to reduce the particle size to an acceptable level. This material is then blended with the other ink components. Optionally, a surfactant may be added to enhance the pigment dispersion and modify the surface tension of the ink to control its penetration into the paper. Suitable surfactants include nonionic, amphoteric and ionic surfactants.

In another aspect, the present invention provides a method for reducing intercolor bleed on a printed substrate comprising the steps of: applying a first aqueous ink to a first area of a substrate, said first aqueous ink comprising a pigmented dispersion comprising a cationic dye and a pigment; and applying a second aqueous ink to a second area of said substrate, said second aqueous ink comprising a pigment and an anionic dispersant, wherein said first area and said second area are in communication with each other. The steps of applying a first aqueous ink and applying a second aqueous ink may occur in any order or simultaneously.

Generally, the pigment dispersions disclosed herein can be made by the addition of three components: water, a cationic dye, and pigment. These components are added in specific ratios such that the desired pigment to cationic dye ratio (P:D) and the total percent solids criteria are met. The components are generally premixed and then introduced into the mill and milled until the desired particle size is obtained.

Generally, the inks disclosed herein can be made by first adding the humectant set to water, followed by the addition of a biocide, if any. Next, a surfactant can be added. Finally, the pigment dispersion is added. The ingredients are mixed well and filtered.

The following examples are detailed descriptions of methods of preparation and use of the inks and the ink system of the present invention. The detailed descriptions fall within the scope of, and serve to exemplify, the more general description set forth above. These examples are presented for illustrative purposes only, and not intended as a restriction on the scope of the invention.

EXAMPLES

Example 1

A cationic pigment comprising Astra Blue 6 GLL (AB) (a commercial form equivalent to Basic Blue 140) cationic dye and Monarch® 880 carbon blade pigment in a ratio of 4:1 was prepared as follows.

First a dye solution was prepared. To a 400 mL beaker was added 10 g of dry Astra Blue 6GLL, followed by the addition of 100 g of DI water. The mixture was stirred using a magnetic stir bar. Acetic acid was added to the mixture while the pH was monitored. The pH was maintained between 4.0 and 5.0 until stable. For this example, the pH was stabilized at 4.46. It may be necessary to add additional water to completely dissolve the dye. The final dye solution should be between 4 and 5% dye at a pH between 4 and 5. The dye solution was then filtered. After filtering, the % solids was checked by drying the solution in an oven. The final solution was 4.28% dye and pH of 4.46.

A dispersion was made at a P:D ratio of 4:1 by adding 28.8 g of Monarch® 880 into an attritor cup, followed by the addition of 168.22 g of the dye solution prepared above. The mixture was carefully stirred with a spatula until the pigment was wetted thoroughly. The attritor cup was placed onto the attritor assembly. Next, was added 1670 g of 2.0 mm YTZ grinding media into the attritor cup. A water circulator was attached to the cooling jacket, and set to a temperature of 30° C. The attritor was set on high and allowed to grind the mixture until a suitable particle size was reached. A particle size of 109 nm was reached at 3 hours of grinding time. Once the acceptable particle size was reached, the dispersion was separated from the grinding media using a sieve.

Example 2

A cationic pigmented dispersion comprising Astra Blue 6GLL and Monarch® 880 carbon black pigment at a P:D ratio of 8:1 was prepared using the procedure described in Example 1, except that necessary changes in amounts of Astra Blue 6GLL and Monarch®. 880 were made.

Example 3

A cationic pigmented dispersion comprising Astra Blue 6GLL and Monarch® 880 carbon black pigment at a P:D ratio of 10:1 was prepared using the procedure described in Example 1; except that necessary changes in amounts of Astra Blue 6GLL and Monarch® 880 were made.

Example 4

A cationic pigmented dispersion comprising Basic Blue 3 (BB) cationic dye and Monarch® 880 carbon black pigment at a P:D ratio of 4:1 was prepared using the procedure described in Example 1, except that Basic Blue 3 was used as the cationic dye and necessary changes in amounts of Basic Blue 3 and Monarch® 880 were made.

Example 5

Ink AB4:1

Using a cationic pigmented dispersion made according to the method described in Example 1 where the pigment to dye ratio is 4:1, a black pigmented ink was made using the standard black ink formulation described above. The amounts of various ingredients are as follows: 4% by weight pigment (P:D 4:1); 5% by weight of polyethylene glycol (molecular weight 1000); 5% by weight of 2-pyrrolidone; 5% 2,2-thiodiethanol; 0.5% by weight of 1,2-hexanediol; and the balance being deionized water.

Example 6

Ink AB8:1

Using a cationic pigmented dispersion made according to the method described in Example 2 where the pigment to dye ratio is 8:1, a black pigmented ink was made using the standard black ink formulation described above. The amounts of various ingredients are as follows: 4% by weight pigment (P:D 8:1); 5% by weight of polyethylene glycol (molecular weight 1000); 5% by weight of 2-pyrrolidone; 5% 2,2-thiodiethanol; 0.5% by weight of 1,2-hexanediol; and the balance being deionized water.

Example 7

Ink AB10:1

Using a cationic pigmented dispersion made according to the method described in Example 3 where the pigment to dye ratio is 10:1, a black pigmented ink was made using the standard black ink formulation described above. The amounts of various ingredients are as follows: 4% by weight pigment (P:D 10:1); 5% by weight of polyethylene glycol (molecular weight 1000); 5% by weight of 2-pyrrolidone; 5% 2,2-thiodiethanol; 0.5% by weight of 1,2-hexanediol; and the balance being deionized water.

Example 8

Ink BB4:1

Using a cationic pigmented dispersion made according to the method described in Example 4 where the pigment to dye ratio is 4:1, a black pigmented ink was made using the standard black ink formulation described above. The amounts of various ingredients are as follows: 4% by weight pigment (P:D 4:1); 5% by weight of polyethylene glycol (molecular weight 1000); 5% by weight of 2-pyrrolidone; 5% 2,2-thiodiethanol; 0.5% by weight of 1,2-hexanediol; and the balance being deionized water.

Example 9

Ink Control A

Using a carbon black pigment Monarch® 880 dispersed in a terpolymer as provided in U.S. Pat. No. 5,719,204, in a pigment to dispersant ratio of 5:1, the black pigmented Ink Control A was made using the standard black ink formulation described above. The amounts of various ingredients are as follows: 4% by weight of pigment; 5% by weight of polyethylene glycol (Mw 1000); 5% by weight of 2-pyrrolidone; and 5% by weight of 2,2-thiodiethanol, and the balance being deionized water.

Example 10

Ink Control B

Using the carbon black pigments Monarch® 880 and a self-dispersing carbon black, the black pigmented Ink Control B was made using the standard black ink formulation described above. The amounts of various ingredients are as follows: 4% by weight of carbon black of which 2.67% was self-dispersing carbon black pigment and 1.33% was Monarch® 880 dispersed in a terpolymer as provided in U.S. Pat. No. 5,719,204; 5% by weight of polyethylene glycol (Mw 400); 5% by weight of 2-pyrrolidone; and 5% by weight of 1,2-propanediol; 2.6% by weight 1,2-hexanediol; and 2% by weight of acrylic acid/butyl acrylatelmethyl methacrylate binder (Mw 150,000 to 300,000), and the balance being deionized water.

Example 11

Using the yellow pigment PY 74 dispersed in a terpolymer as provided in U.S. Pat. No. 5,719,204, in a pigment to dispersant ratio of 3:1, a yellow pigmented ink was made to use in the experiments described in table 1. The yellow ink formulation is as follows: 3% by weight of pigment (pigment:dispersant 3:1); 5% by weight of polyethylene glycol (Mw 1000); 5% by weight of 2-pyrrolidone; and 5% by weight of 2,2-thiodiethanol; 1% by weight of 1,2-hexanediol; and the balance being deionized water.

Example 12

Using the yellow pigment PY 74 dispersed in a terpolymer as provided in U.S. Pat. No. 5,719,204, in a pigment to dispersant ratio of 3:1, a yellow pigmented ink was formulated and was used in bleed evaluation tests described in table 2. The yellow ink formulation is as follows: 3% by weight of pigment (pigment:dispersant 3:1); 5% by weight of polyethylene glycol (Mw 1000); 5% by weight of 2-pyrolidone; and 5% by weight of 2,2-thiodiethanol; 2% by weight of 1,2-hexanediol; and the balance being deionized water.

Example 13

Using the magenta pigment Pigment Red 122 dispersed in a terpolymer as provided in U.S. Pat. No. 6,225,370, in a pigment to dispersant ratio of 3:1, a magenta pigmented ink was formulated and was used in bleed evaluation tests described in table 3. The magenta ink formulation is as follows: 3% by weight of pigment (pigment:dispersant 3:1); 5% by weight of polyethylene glycol (Mw 1000); 5% by weight of 2-pyrrolidone; 5% by weight of 2,2-thiodiethanol; 2% by weight of 1,2-hexanediol; and the balance being deionized water.

Example 14

Table 1 below lists the results of bleed control evaluation tests between the black inks described in Examples 5, 6, 7, 8, and 9, and the standard yellow color pigmented ink described in Example 11. For the bleed control evaluation tests, two drops of yellow ink were placed adjacent to the black ink in the printing process.

The bleed was graded on a scale of 1 to 6, with 1 being the best and 6 being the worst. Six different plain multipurpose paper media were used in the evaluation.

TABLE 1

Black To Yellow Bleed Results

| PAPER | INKS | | | | |
|---|---|---|---|---|---|
| | Control A | AB10:1 | AB8:1 | AB4:1 | BB4:1 |
| Laser 1000 | 5 | 3 | 3 | 2 | 2 |
| Relay MP | 5 | 2 | 2.5 | 1 | 2 |
| Tidal MP | 5 | 2 | 2 | 2 | 1 |
| Neutech | 6 | 4 | 4 | 3 | 3 |
| HP Multipurpose | 6 | 3 | 3 | 2 | 2 |
| Hammer Mill | 5 | 2 | 2 | 1 | 1 |
| X9000 | 6 | 3 | 2 | 2 | 2 |
| Average | 5.43 | 2.71 | 2.64 | 1.86 | 1.86 |

As can be seen from the results shown in table 1, the ink compositions of the present invention can have superior bleed control on various types of plain paper as compared to Control Ink A.

Example 15

Tables 2 and 3 below list the results of bleed control evaluation tests between the black inks described in Examples 5, 9, and 10 and the standard yellow and magenta color pigmented inks described in Examples 12 and 13, respectively. For the bleed control evaluation tests, two drops of yellow or magenta ink were placed adjacent to the black ink in the printing process.

The bleed was graded on a scale of 1 to 6, with 1 being the best and 6 being the worst. Six different multipurpose plain paper media were used in the evaluation.

TABLE 2

Black To Yellow Bleed Results

| | INKS | | |
|---|---|---|---|
| PAPER | Control A | Control B | AB4:1 |
| Laser 1000 | 2.5 | 4 | 1.5 |
| Relay MP | 3.5 | 3.5 | 1 |
| Tidal MP | 2.5 | 3.5 | 1.5 |
| HP Multipurpose | 6 | 3.5 | 1.5 |
| Hammer Mill | 5 | 3 | 2 |
| X9000 | 4.5 | 3 | 2 |
| Average | 4 | 3.42 | 1.58 |

TABLE 3

Black To Magenta Bleed Results

| | INKS | | |
|---|---|---|---|
| PAPER | Control A | Control B | AB4:1 |
| Laser 1000 | 4 | 3 | 1 |
| Relay MP | 3 | 3.5 | 1 |
| Tidal MP | 2.5 | 3 | 2 |
| HP Multipurpose | 5 | 2 | 1.5 |
| Hammer Mill | 3.5 | 2 | 1 |
| X9000 | 4 | 2 | 1 |
| Average | 3.67 | 2.58 | 1.25 |

As can be seen from the results shown in tables 2 and 3, the ink compositions of the present invention can have superior bleed control on various types of plain paper as compared to Control Inks A and B.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An ink set comprising:
   (a) a first ink comprising a cationic pigmented dispersion in aqueous solution, wherein the cationic pigmented dispersion comprising a cationic dye and a first pigment; and
   (b) a second ink comprising an anionic dispersion in aqueous solution.

2. The ink set of claim 1, wherein the cationic dye is milled with the pigment.

3. The ink set of claim 1, wherein the first pigment is carbon black.

4. The ink set of claim 1, wherein the cationic dye comprises at least one positively charged atom.

5. The ink set of claim 1, wherein the cationic dye comprises anthraquinone, azo, diphenylmethane, triphenylmethane, acridine, pyran, thiopyran, indamine, azine, oxazine, thiazine, hemicyanine, azacarbocyanine, diazacarbocyanine, triazacarbocyanine, or diazahemicyanine dyes.

6. The ink set of claim 1, wherein the cationic dye comprises Basic Blue 140, Basic Blue 3 or nigrosine.

7. The ink set of claim 1, wherein the ratio of the first pigment to cationic dye is from about 14:1 to about 1:1.

8. The ink set of claim 1, wherein said first ink further comprises a humectant, a penetrant, a biocide and combinations thereof.

9. The ink set of claim 1, wherein the anionic dispersion comprises a polymeric dispersant.

10. The ink set of claim 9, wherein the anionic dispersion further comprises a second pigment, wherein said second pigment comprises a colored pigment.

11. The ink set of claim 10, wherein the second pigment comprises azo pigments, polycyclic pigments, dye lakes, organic pigments, inorganic pigments, or fluorescent pigments.

12. A method for controlling intercolor bleed on a printed substrate comprising the steps of:
   (a) applying a first ink to a first area of a substrate, wherein the first ink comprises a cationic pigmented dispersion in aqueous solution, wherein the cationic pigmented dispersion comprises a cationic dye and a first pigment; and
   (b) applying a second ink to a second area of said substrate, wherein said send ink comprises an anionic dispersion in aqueous solution,
   wherein said first area and said second area are in communication with each other.

13. The method of claim 12, wherein the cationic dye is milled with the pigment.

14. The method of claim 12, wherein first pigment is carbon black.

15. The method of claim 12, wherein the cationic dye comprises at least one positively charged atom.

16. The method of claim 12, wherein the cationic dye comprises anthraquinone, azo, diphenylmethane, triphenylmethane, acridine, pyran, thiopyran, indamine, azine, oxazine, thiazine, hemicyanine, azacarbocyanine, diazacarbocyanine, triazacarbocyanine, or diazahemicyanine dyes.

17. The method of claim 12, wherein the cationic dye comprises Basic Blue 140, Basic Blue 3, or nigrosine.

18. The method of claim 12, wherein the ratio of the first pigment to cationic dispersing dye is from about 14:1 to about 1:1.

19. The method of claim 10, wherein said first ink further comprises a humectant, a penetrant, a biocide and combinations thereof.

20. The method of claim 12, wherein the anionic dispersion comprises a polymeric dispersant.

21. The method of claim 20, wherein the anionic dispersion further comprises a second pigment, wherein said second pigment comprises a colored pigment.

22. The method of claim 20, wherein the second pigment comprises azo pigments, polycyclic pigments, dye lakes, organic pigments, inorganic pigments, or fluorescent pigments.

* * * * *